United States Patent [19]
Fischer et al.
[11] 4,455,013
[45] Jun. 19, 1984

[54] HOIST

[75] Inventors: Gerhard Fischer, Deggenhausertal-Wahlweiler; Harald Berger, Meersburg, both of Fed. Rep. of Germany
[73] Assignee: Interpatent B.V., Netherlands

[21] Appl. No.: 366,188
[22] Filed: Apr. 7, 1982
[30] Foreign Application Priority Data
Apr. 15, 1981 [DE] Fed. Rep. of Germany ....... 3115206
[51] Int. Cl.[3] .......................... B60T 7/12; B66D 1/48; B66D 5/00
[52] U.S. Cl. .................................... 254/267; 188/134; 254/378; 254/386
[58] Field of Search ............... 254/386, 385, 367, 375, 254/378, 379, 277, 267; 92/23, 136, 138, 143; 188/134

[56] References Cited

U.S. PATENT DOCUMENTS

| | | | |
|---|---|---|---|
| 2,772,085 | 11/1956 | Dodge | 267/128 |
| 3,286,989 | 11/1966 | Bangerter et al. | 254/331 |
| 3,368,796 | 2/1968 | Ulbing | 254/267 |
| 3,537,686 | 11/1970 | McKendrick | 254/386 X |
| 3,669,411 | 6/1972 | McKendrick | 254/386 |
| 4,194,598 | 3/1980 | Suozzo | 188/134 |
| 4,346,793 | 8/1982 | Fuse et al. | 188/134 |

*Primary Examiner*—Stuart S. Levy
*Assistant Examiner*—Katherine Jaekel
*Attorney, Agent, or Firm*—McGlew and Tuttle

[57] ABSTRACT

A hoist comprises a housing carrying a fixed and slidable sheave set which are engaged by a rope. A piston and cylinder combination are connected to the slidable sheave set for moving it and thus moving a load connected to the rope. The piston has a threaded rod connected to the displaceable sheave set which carries a threaded nut. The axial movement of the nut is restrained by a sleeve which permits rotation of the nut with axial movement of the rod. If the axial movement of the rod accelerates above a selected limit, for example when the load is abruptly removed from the rope, the nut moves against a friction surface in the sleeve to brake the rotation thereof and thus brake the axial movement of the rod.

10 Claims, 2 Drawing Figures

HOIST

FIELD AND BACKGROUND OF THE INVENTION

The present invention relates in general to hoists and in particular to a new and useful hoist having a braking arrangement which compensates for abrupt acceleration of loads carried by the hoist, with abrupt changes in such loads.

The hoist of this kind is disclosed in German Utility Model No. 7,934,679. In that design, a braking device comprises a closed cylinder which is secured to the displacement piston and filled with a fluid, a fixed separating piston which is inserted in the cylinder and by which the cylinder is subdivided into a first and second cylinder space, and a throttling and shut-off device which is inserted in a conduit provided in the separating piston. Aside from the considerably expensive manufacture of such a hydraulically or pneumatically operated braking device, disturbances in operation may occur, since leaks at the joints between parts which are to be sealed against each other, are inevitable in the long run, and a satisfactory operation is not ensured over longer periods of time.

SUMMARY OF THE INVENTION

The present invention is directed to a braking device for a hoist of the above-mentioned kind, in which the operating piston in reliably prevented, in a mechanical way, from being displaced too fast. This feature forms a safety measure against the rope being pulled up abruptly or with a start. However, what is primarily aimed at is to ensure that the braking device remains in operation for a long period of time without necessitating any maintenance. Further, the construction is to be simplified so as to reduce manufacturing costs.

Accordingly an object of the present invention is to provide a hoist which comprises a housing, a fixed sheave set connected to the housing, a displaceable sheave set movable with respect to the housing, a cylinder connected to the housing, a piston slidable in the cylinder and having a threaded rod connected to the displaceable sheave set, the cylinder being pressurizable to move the piston and displace the displaceable sheave set, tackle engaged to the fixed and displaceable sheave sets to move a load with displacement of the displaceable sheave set, a nut threaded to the rod, a sleeve connected to said housing for restraining axial motion of the nut with respect to the rod in at least one direction and permitting rotation of the nut, the nut and sleeve having facing friction surfaces, and biasing means biasing the friction surface of the nut away from the friction surface of the sleeve to permit axial movement of the rod and rotation of the nut at a maximum selected acceleration when the cylinder is pressurized, and with the acceleration exceeded the nut moving against the biasing means with its friction surface engaged with the sleeve friction surface to break the rotation of the nut and thus break the axial movement of the rod.

A further object of the invention is to provide the fixed sheave set on an intermediate member between a housing part containing the displaceable sheave set and a housing part defining the cylinder.

A still further object of the invention is to provide such a hoist wherein the sleeve is fixed to the intermediate member, the sleeve having an extension extending into the intermediate member.

Another object of the invention is to provide such a hoist wherein the biasing means comprises at least one spring connected between the sleeve and the nut for biasing the nut in at least one axial direction with respect to the rod.

If a hoist of the above mentioned kind is equipped with a braking device in accordance with the invention, it is made sure that even upon a sudden unloading of the rope, the displacement piston will not move at high speed into its end position and take up the rope abruptly. This braking device while being of simple design and thus inexpensive to manufacture, nevertheless makes it possible to displace and adjust the piston continuously in either direction so that any quick retraction of the rope and accidents that might result therefrom, are securely prevented.

That is, if the acceleration of the displacement piston exceeds a certain value, the nut rotatably engaged on one of the piston rods is taken along by the piston rod in the axial direction. This is because the mass of the nut is accelerated with a time delay. Due to its axial displacement, the nut comes into contact with the friction faces of the fixed sleeve, so that the piston rod and, consequently, the piston are reliably braked. In this way, too strong an acceleration of the displacement piston and thus of the rope, are securely prevented. This means that an absolutely reliably operating safety against an unintentional sudden takeup of the rope is obtained with a simple, purely mechanical means, so that no maintenance is needed, and, since release shocks are absorbed, a disturbance-free operation of the hoist for a long period of time is ensured.

Accordingly a still further object of the invention is to provide a hoist with braking protection which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following, one embodiment of the invention is explained in more detail with reference to the drawings in which.

DETAILED DESCRIPTION OF THE PREFERRED EMBODIMENT

Figure 1:
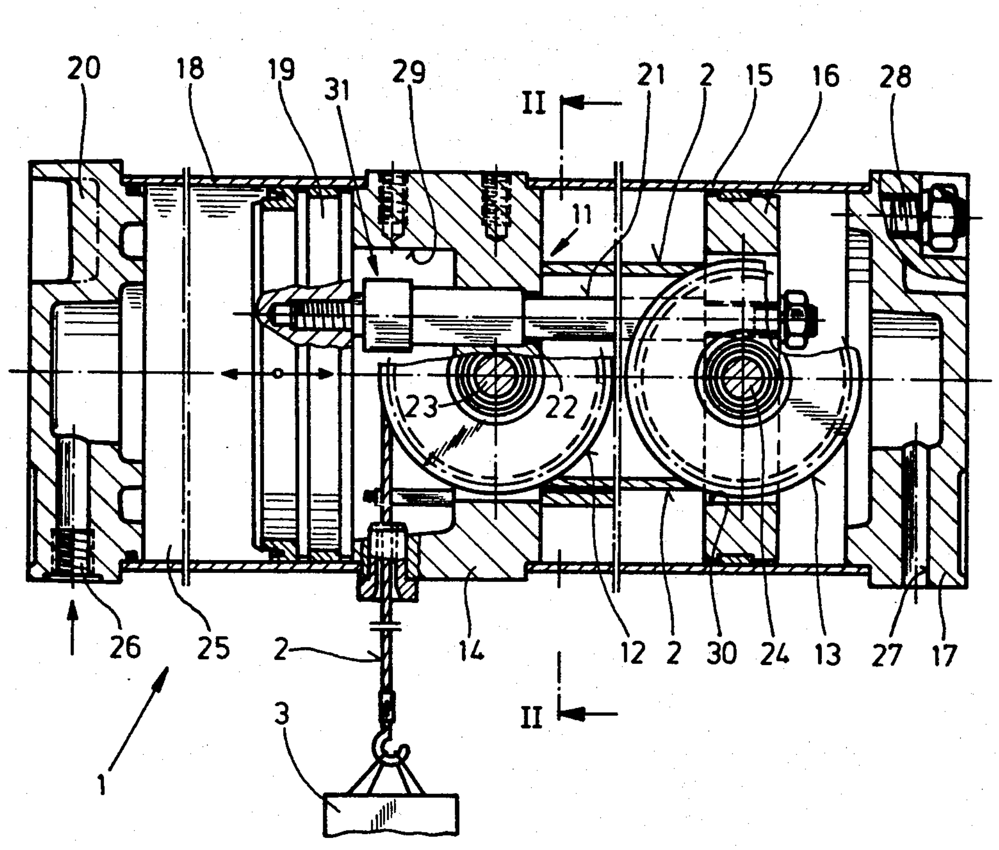
FIG. 1 is an axial sectional view of a hoist equipped with a braking device carried on a piston rod.

A hoist, generally shown at 1 in FIG. 1, for lifting or lowering a load 3 attached to a rope 2, substantially comprises a tackle 11 including sheave sets 12 and 13 of individual sheaves over which rope 2 is run. A piston 19, which is displaceable by the compressed air, is rigidly connected, through two piston rods 21 (only one being shown), to a slide 16. Slide 16 carries sheave set 13 which is displaceable. The fixed sheave set 12 is mounted for rotation about an axis 23 in in an intermediate member 14 which is provided with a rectangular recess 29 for this purpose, and to which a housing 15 for receiving slide 16 is connected. Housing 15 has a cover 17, and is connected to a cylinder 18 for receiving displacement piston 19. Housing 15 and cylinder 18 are hermetically secured to intermediate member 14. Two diametrically opposite recesses 22 (one shown) are provided in intermediate member 14 to guide piston rods 21 which therefore extend through and not past member 14. Cylinder 18 has a cover 20. Consequently, intermediate member 14 forms a housing part which is closed to the outside, and hoist 1 forms a completely tight, closed constructional unit. By means of external tie rods (one designated 28 being shown) bearing against both cover 17 and cover 20 for closing cylinder 18, the individual parts of hoist 1 are clamped together.

If compressed air is supplied through a connection 26 provided in cover 20, into pressure space 25 of the displacement piston 19, the piston is displaced to the right. And since slide 16 is rigidly connected to the piston through piston rods 21 which are designed as staybolts, sheave set 13 which is mounted for rotation about axis 24 in a recess 30 of slide 16, is also displaced to the right. In this way load 3 is lifted. The inside of housing 15 is vented through a bore 27. Upon venting pressure space 25, load 3 is lowered. It is noted that rods 21, housing 15 and cylinder 18 are longer than shown in the horizontal direction of FIG. 1, to allow substantial motion of load 3.

If load 3 is removed however, for example if a patient forming part of the load withdraws from a suspension support, piston 19 encountering no opposite force, would move very quickly to its right-hand end position, which may be determined by a stop (not shown), and rope 2 might be impelled upwardly. To avoid this, a braking device 31 is associated with piston 19 by means of which the acceleration of the piston is limited to a maximum, or the displacement of the piston is stopped at soon as such a maximum is exceeded, so that a sudden pull on load 3 is eliminated.

Figure 2:
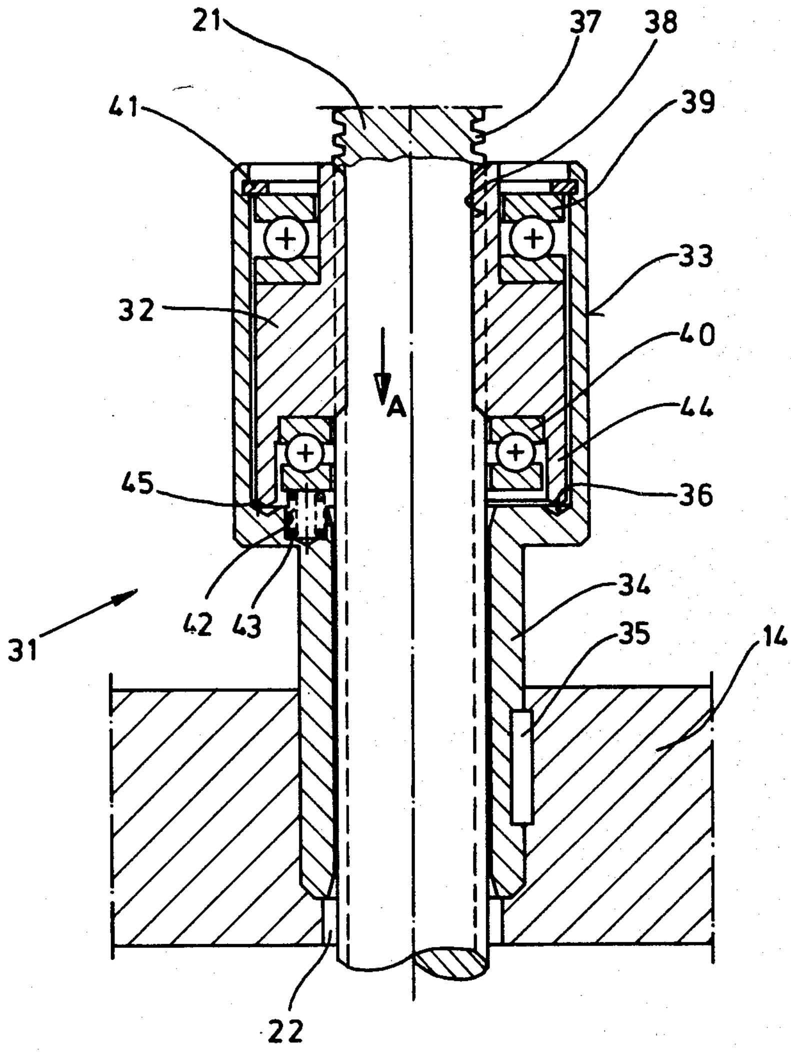
FIG. 2 is an enlarged sectional view of the braking device shown in FIG. 1 but oriented vertically rather than horizontally.

As shown in FIG. 2, braking device 31 comprises a nut 32 which is rotatably engaged on one of the piston rods 21, and a sleeve 33 in which the nut is received and which is firmly connected to intermediate member 14 by means of an extension 34 and a key 35. Nut 32 is operatively connected to piston rod 21 by an internal trapezoidal thread 38 and an external thread 37, and mounted for rotation within sleeve 33 by means of antifriction thrust bearings 39 and 40. Compression springs 43 (one shown) inserted in a plurality of bores 42 (one shown) bias bearing 40 and therethrough nut 32 and the other bearing 39 against a safety ring 41 which is inserted in sleeve 31.

Since threads 37 and 38 are self-locking, piston rod 21 moving in the direction of arrow A causes a rotation of nut 32, up to a predeterminable acceleration of the piston rod. Upon exceeding this limit of acceleration, for example because of a removal of load 3 with piston 19 still under pressure so that in the absence of a counterforce the piston would suddenly be displaced at high speed into its end position, nut 32 is taken along axially (direction A). This is because nut 32 is connected to piston rod 21 only operatively through threads 37 and 38 and its mass cannot be accelerated in rotary motion within the same period of time. Then, since V-shaped friction faces 45 are provided in sleeve 33, which cooperate with opposite faces 36 provided on an extension 44 of nut 32, the nut and the piston rod operatively connected thereto, are braked. Displacement piston 19 is thus held back and a quick takeup of rope 2 is reliably prevented. Thus, it is ensured that the speed of the displacement piston does not exceed a maximum, not even upon an instantaneous unloading of hoist 1, and that unloading shocks are absorbed.

As soon as nut 32 is no longer taken along in the axial direction by piston rod 21, the nut is returned by compression springs 43 into its operating position shown in FIG. 2, so that no braking takes place any longer, since faces 36 and 45 are disengaged. Due to the provided V-shape or double cone shape of braking faces 36, 45, nut 32 is centered during the braking as well.

While a specific embodiment of the invention has been shown and described in detail to illustrate the application of the principles of the invention, it will be understood that the invention may be embodied otherwise without departing from such principles.

The invention thus is a hoist comprising:

a housing;

a fixed sheave set connected to the housing;

a displaceable sheave set movable with respect to the housing;

a cylinder connected to the housing;

a piston slidable in the cylinder having a threaded piston rod connected to the displaceable sheave set, the cylinder being pressurizable to move the piston and displaceable sheave set;

tackle engaged to said fixed and displaceable sheave sets and connectable to a load which is movable with displacement of the displaceable sheave set;

a nut threadably engaged to the rod;

a sleeve connected to the housing for restraining axial motion of the nut with axial motion of the rod in at least one direction and for permitting rotation of the nut up to a maximum acceleration;

each of the nut and sleeve having facing friction surfaces which are spaced apart with rotation of the nut below the maximum acceleration and engaged with each other with rotation of the nut at the maximum acceleration to brake the rotation of the nut and thus brake the axial motion of the rod.

What is claimed is:

1. A hoist comprising:

a housing;

a fixed sheave set connected to the housing;

a displaceable sheave set movable with respect to the housing;

a cylinder connected to the housing;

a piston slidable in the cylinder having a threaded piston rod connected to the displaceable sheave set, the cylinder being pressurizable to move piston and displaceable sheave set;

tackle engaged to said fixed and displaceable sheave sets and connectable to a load which is movable with displacement of the displaceable sheave set;

a nut threadably engaged to the rod;

a sleeve connected to the housing for restraining axial motion of the nut with axial motion of the rod in at least one direction and for permitting rotation of the nut up to a maximum acceleration;

each of the nut and sleeve having facing friction surfaces which are spaced apart with rotation of the nut below the maximum acceleration and engaged with each other with rotation of the nut at the maximum acceleration to brake the rotation of the nut and thus brake the axial motion of the rod.

2. A hoist according to claim 1, wherein said housing is cylindrical, an intermediate flange connected to said housing between a portion of said housing for displaceably receiving said displaceable sheave set and a portion of said housing defining said cylinder, said intermediate flange rotatably carrying said fixed sheave set, said intermediate flange having an opening therethrough for receiving said threaded piston rod for axial motion.

3. A hoist according to claim 2, wherein said sleeve includes an axial extension connected to said intermediate flange at the opening therethrough.

4. A hoist according to claim 1, including biasing means connected between said nut and said sleeve for biasing said sleeve against motion in said at least one axial direction and for maintaining a spacing between said friction surfaces.

5. A hoist according to claim 4, wherein said biasing means includes at least one thrust bearing connected between said nut and said sleeve for rotatably mounting said nut to said sleeve and at least one spring connected between said sleeve and said bearing.

6. A hoist according to claim 5, including a plurality of bores in said sleeve and said biasing means comprising a spring in each bore connected between said sleeve and said bearing.

7. A hoist according to claim 1, wherein said rod includes a smooth motion trapezoidal thread thereon and said nut includes a smooth motion trapezoidal thread threadably engaged to said smooth motion trapezoidal thread of said rod.

8. A hoist according to claim 1, wherein each of said nut and sleeve friction faces comprise V-shaped surfaces which are engageable to brake rotation of said nut and center the rotation of said nut with respect to said sleeve.

9. A hoist according to claim 1, wherein said nut and sleeve friction faces are convex and trough-shaped respectively and engageable for braking rotation of said nut and centering rotation of said nut with respect to said sleeve.

10. A hoist according to claim 1, wherein said nut includes an annular extension which carries the friction face of said nut, said nut friction face being of a shape corresponding to the shape of said nut friction face.

* * * * *